United States Patent [19]

Vermonet

[11] Patent Number: 4,570,362
[45] Date of Patent: Feb. 18, 1986

[54] ELASTOMERIC SUPPORT SURFACE WITH A NETWORK OF SCULPTURES, NOTABLY A SO-CALLED "MARINE" SHOE SOLE

[75] Inventor: Christian Vermonet, Cholet, France

[73] Assignee: Societe Technisynthese s.a.r.l., Saint Pierre Montlimart, France

[21] Appl. No.: 656,908

[22] Filed: Oct. 2, 1984

[30] Foreign Application Priority Data

Oct. 19, 1983 [FR] France ............... 83 16639

[51] Int. Cl.[4] .............. A43B 5/06; A43B 5/00; B60C 11/06; A47G 29/00
[52] U.S. Cl. .............. 36/59 C; 36/32 R; D2/320; 152/209 R; 248/346.1; 428/167
[58] Field of Search ........... 36/32 R, 59 R, 59 C, 36/43, 29; D2/319-321; D12/140, 141, 148, 150; 152/209 R, 209 D; 248/633, 346.1; 428/167, 169

[56] References Cited

U.S. PATENT DOCUMENTS

| | | | |
|---|---|---|---|
| D. 201,864 | 8/1965 | Smith | D2/320 |
| D. 216,611 | 2/1970 | Dittmar | D2/320 |
| D. 252,327 | 7/1979 | Shirashoji | D12/148 |
| D. 255,174 | 6/1980 | Hamada | D2/320 |
| 2,595,961 | 5/1952 | Layne | 248/346.1 |
| 3,169,327 | 2/1965 | Fukuoka | 36/34 |
| 3,730,821 | 5/1973 | Jackson | 428/167 |
| 4,281,467 | 8/1981 | Anderie | 36/32 R |
| 4,378,641 | 4/1983 | Tarlow | |
| 4,462,446 | 7/1984 | Goergen et al. | 152/209 R |

FOREIGN PATENT DOCUMENTS

| | | | |
|---|---|---|---|
| 1365430 | 5/1964 | France | |
| 2148347 | 3/1973 | France | |
| 2434587 | 3/1980 | France | |
| 1152746 | 5/1969 | United Kingdom | 36/59 C |

Primary Examiner—Werner H. Schroeder
Assistant Examiner—Steven N. Meyers
Attorney, Agent, or Firm—Young & Thompson

[57] ABSTRACT

The present invention relates to an elastomeric support surface having a network of sculptures.

According to the invention, the support surface is formed with a transverse network of narrow channels (2) having periodical widened portions (3) in each channel, a tong (4) of a width less than the width of the walls defining the channel and of a height equal to the depth of the channel being provided axially in each widened portion (3).

Such a support surface is notably designed for forming the treading surface of so-called marine shoes in order to drain-off the water which can accumulate inside the sculptures.

5 Claims, 3 Drawing Figures

ELASTOMERIC SUPPORT SURFACE WITH A NETWORK OF SCULPTURES, NOTABLY A SO-CALLED "MARINE" SHOE SOLE

FIELD OF THE INVENTION

The present invention relates to a support surface made of an elastomer such as rubber, polyvinylchloride or similar materials, provided with a network of profiles or sculptures for facilitating the evacuation of water and for avoiding the formation of a film of water between the support surface and the bearing surface. It has been designed more especially as a pattern for a shoe or a boot sole used aboard boats, but it is also usable in other applications, notably in footwear and vehicle tires.

BACKGROUND OF THE INVENTION

It is a usual practice in the field of tires and shoe soles to provide the bearing surface with networks of channels defining therebetween ribs in order to improve the evacuation of the water being on the surface of the ground in the tire or shoe pressure area and to improve the adherence by avoiding the water film effect. However, such networks have parallel channels and the ribs are nor differentiated in order that some of them cause the circulation of the water inside the channels defined by the other ribs. In fact, the water of the circulation surface is evacuated due to a local increase of the bearing pressure in the bearing area, but the water can stagnate in the channels between the ribs and create a lubrication phenomenom with the wetted surface with which the bearing surface comes in contact.

There is shown in FR-A-2 434 587 a shoe sole comprising on its surface networks of parallel ribs for controlling the sliding between shoe and ground in order to authorize a slipping of definite value. The ribs which are parallel to each other are continuous and have alternatively wide areas with rounded edges and narrow areas. The channels provided between the ribs have a width substantially constant and there are no narrow tongs of limited length disposed axially in the widened portions of the channels.

OBJECTS AND SUMMARY OF THE INVENTION

The elastomeric support surface having a network of scultpures which is the object of this invention is provided in known manner with a transverse network of narrow channels leaving therebetween protruding ribs the free edges of which form the bearing surface, and is characterized in that the network of channels is formed with periodical widened portions of each channel, a tong having a width less than the width of the wall defining the channel and a height equal to the depth of the channel being provided axially in each widened portion.

The presumed mode of operation of the arrangement according to the invention is that the deformation of the tong when it comes to bear on the surface repels the water entrapped between the tong and the wall of the widened portion in the channel, thereby causing a discharge circulation of the water, which avoids the stagnation of water between the channels of the support surface and the formation underneath said surface of a continuous film likely to slide on the water film covering the circulation surface. Indeed, one cannot consider draining-off the water from the bearing surface prior to the moment when the support surface of the tire and of the sole comes to bear on said surface and the only possibility is to drain-off the water, in all possible measure, from the support surface.

According to another feature of the invention, the periodical widened portions in two successive transverse channels are internested, the widened portions and the tongs being staggered.

According to another feature, channels of larger width cross the channels of the network and form collectors.

According to an embodiment, the channels have a width of about 0.5 mm and a depth of 2 mm, the widened portion have a width of about 1.5 mm and a length of 12 mm, the walls defining the channels have a width from 1 to 1.5 mm and the tongs a width of 0.5 mm and a length of 11 mm.

BRIEF DESCRIPTION OF DRAWINGS

In the accompanying drawing has been shown, by way of example, a small portion of a support surface according to the invention. In this drawing.

DESCRIPTION OF EMBODIMENT

Figure 1:
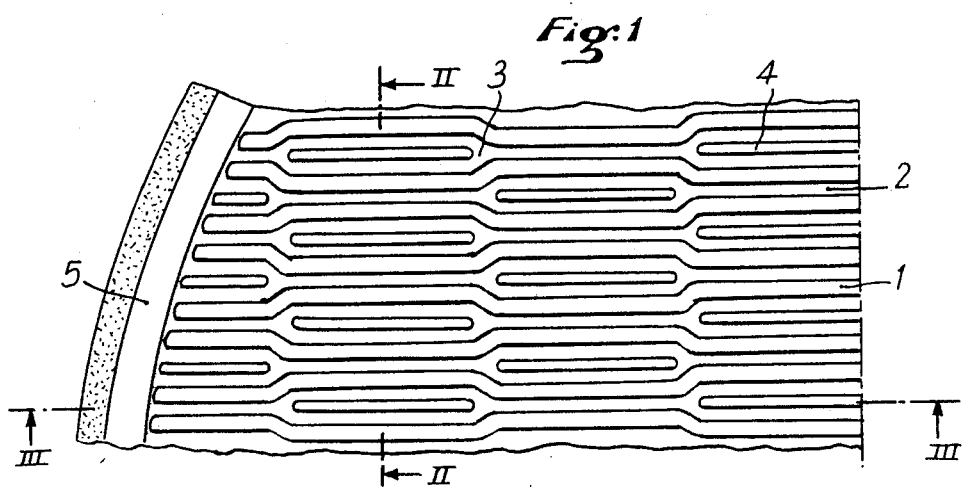
FIG. 1 is a plan view of the surface.
Figure 2:
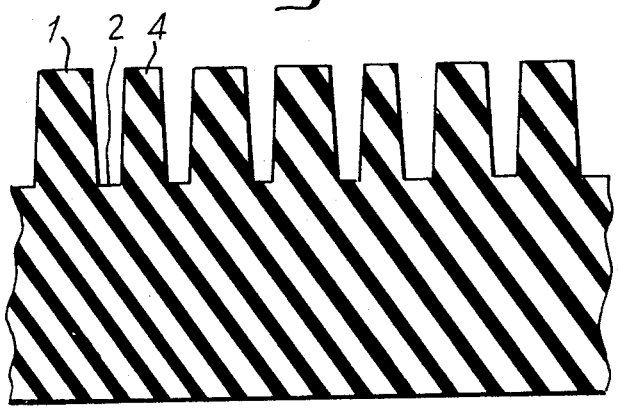
FIG. 2 is a sectional view according to line II—II of FIG. 1.
Figure 3:
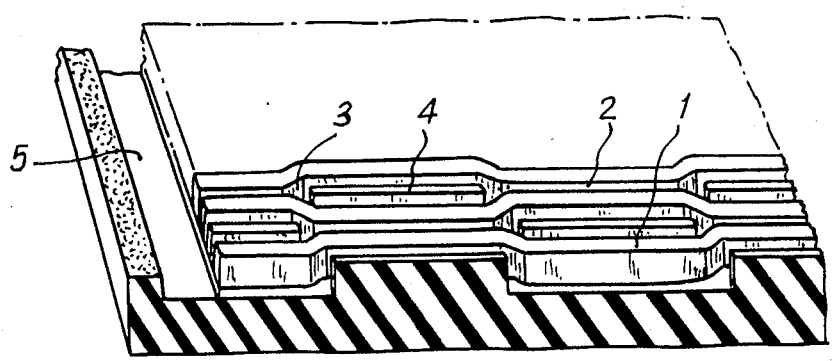
FIG. 3 is a sectional and perspective view along line III—III of FIG. 1.

In the drawings, reference numeral 1 designates the wall separating two channels, 2 a narrow section of a channel, 3 a widened section of a channel and 4 a tong. Said elements have, in the case of a marine shoe sole, the dimensions shown hereabove for the preferential embodiment. Said dimensions can be more important in the case of tires.

In the case of a sole, the periphery of the surface coming to bear on the ground is defined by a channel 5 of larger section and forming a collector.

I claim:

1. An elastomeric support surface with a network of sculptures formed in known manner by a transverse network of narrow channels leaving therebetween protruding ribs the free edges of which form the bearing surface, wherein the network of channels is formed with periodical widened portions of each channel, a tong, having a width less than the width of the walls defining the channel and a height equal to the depth of the channel, being provided axially in each widened portion.

2. An elastomeric support surface according to claim 1, wherein the periodical widened portions in two successive transverse channels are internested, the widened portions and the tongs being staggered.

3. An elastomeric support surface according to claim 1, wherein channels of larger width cross the channels of the network and form collectors.

4. A shoe sole, characterized in that it comprises a treading surface with a network of sculptures formed in known manner by a transverse network of narrow channels leaving therebetween protruding ribs the free edges of which form the bearing surface, wherein the network of channels is formed with periodical widened portions of each channel, a tong, having a width less than the width of the walls defining the channel and a height equal to the depth of the channel, being provided axially in each widened portion.

5. A shoe sole according to claim 4, wherein the channels have a width of about 0.5 mm and a depth of 2 mm, the widened portion have a width of about 1.5 mm and a length of 12 mm, the walls defining the channels have a width from 1 to 1.5 mm and the tongs a width of 0.5 mm and a length of 11 mm.

* * * * *